Patented Mar. 21, 1933

1,902,048

UNITED STATES PATENT OFFICE

SHERMAN OSWALD THOMAS, OF WASHINGTON, DISTRICT OF COLUMBIA, ASSIGNOR TO THE AMERICAN DAIRY SUPPLY COMPANY, OF AUGUSTA, MAINE, A CORPORATION OF MAINE

MATRIX MATERIAL FOR PRODUCTION OF PRINTING PLATES

No Drawing.   Application filed June 18, 1928. Serial No. 286,498.

This invention pertains to the production of printing plates or surfaces, and consists, primarily, in a new composition of matter capable of receiving and retaining perfect impressions from type, engraved plates, blocks and surfaces, from delicate fabrics, and in fact from almost any object the face or surface of which bears relatively raised and depressed portions. The purposes primarily sought and successfully attained through the use of the novel composition are:

To produce speedily and easily, and in a few minutes as compared with hours under existing practice, a finished printing plate or surface of high quality. This object is attained through the use of a composition of matter which can be molded and brought speedily to a smooth, uniform surface capable of receiving and retaining an impression from a suitable pattern, surface or design, however delicate the lines or markings of such pattern or design may be.

A further object is to produce by a single operation, a plate or printing surface complete in all respects and ready for use, without routing and without need of building up of open spaces before casting.

The composition employed is such that it neither expands nor contracts to any appreciable extent, if at all, when poured in a cold state into a mold, or upon a backing sheet, plate or block, or during or after setting therein or thereon. It is, when set, of somewhat wax-like character, more or less tough or tenacious, and unaffected by the temperature at which the molten metal or alloy for producing the printing plate is commonly poured.

The matrix or mold produced from the composition is preferably used but once as a mold or matrix, but the composition of which it is formed may be thrown back into a suitable container, either with or without addition of fresh materials, and softened or liquefied to form new molds or matrices.

The composition is brought to fluid or liquid form without the use of heat, and as indicated, is unaffected by heat after it has become properly set.

Another peculiarity of the composition is that it may be made up in any desired quantity and stored or held ready for use, and that it remains stable and is unaffected by atmospheric conditions or weather changes even after quite long periods of time. It retains its capacity for receiving impressions, does not harden, does not soften, liquefy, or break down, and is ready for instant use.

The composition is preferably made according to the following formula, the avoirdupois scale being here understood, and a batch or quantity of about eleven pounds total weight being assumed, though of course the aggregate weight may be varied at will:

Commercial rubber cement_____ 3 lbs.
Carbon tetrachloride (liquid)_____ 2 lbs.
Benzol (liquid)_____ 2 lbs.
Purified talcum, or chemically pure talcum in powdered form_____ 4 lbs.
Carbon black_____ ½ oz.

Instead of commercial rubber cement the ingredients of which such cement is made may be employed, the rubber (crude rubber or caoutchouc) and the solvent being supplied in quantity sufficient to afford in the mixture the same effect as is afforded by the commercial cement. It is deemed preferable to employ the commercial cement because this avoids the considerable work and time required for the complete dissolving of the rubber, and its thorough commingling or union with the solvent.

Instead of the solvents named in the formula, benzine, chloroform and gasoline can be used, but benzol and carbon tetrachloride are deemed best.

In lieu of talcum, soapstone, fine chalks, or other mineral powders may be used.

The office of the rubber cement is to form a binder for holding together the other ingredients, or the fillers of the composition.

Carbon tetrachloride causes the ingredients to mix more smoothly than they would in the absence thereof.

Benzol is used primarily as a solvent, but is also beneficial because of its tendency to expedite the setting of the composition.

Talcum is preferred to other powders or fillers because it gives to the composition a smooth, soft, silky, or waxy consistency and surface.

The carbon black causes a fine film to rise to the surface of the molded composition, which film tends to prevent adhesion of the form or pattern to the matrix when being pressed against or into the composition, and facilitates detachment of the cast plate or printing body from the mold or matrix. The film of carbon black leaves the mold with the cast plate or printing body, and adheres to such plate or stereotype, but is readily removed therefrom after the same has set and cooled, by application of a few drops of gasoline or like agent.

While the proportions above given are those which experience has thus far shown to be best, these may be varied within reasonable limits and still give good practical results, and it is hence to be understood that I contemplate such variation and deem the same well within the scope of my invention and claims.

In the preparation of the composition I find it expedient to place the several ingredients stated in the formula in a suitable mill or mixer, and to subject them to the action thereof until the several ingredients are thoroughly and intimately commingled, and the reducible substances brought to a state of fine division. While in a fluid state the composition is poured into a suitable mold, or is flowed upon or over a backing sheet as of paper or pulp-board, a wooden block, or a metal plate or sheet, and rolled or pressed to produce a smooth plane surface. Plates of metal, sheets of paper, pulp-board, or the like, blocks of wood, or long strips or sheets of backing material may be thus coated with the composition, which adheres quite tenaciously to the backing, and stored for use.

When it is desired to produce a matrix or mold, a section of the backing material of suitable size, faced or coated with the composition set or solidified thereon and adhering thereto, is cut from the stock strip or body, is suitably impressed by the form, pattern or design, and so impressed, properly supported, and encompassed by suitable guards, receives the molten metal or alloy, which is poured upon the composition or upon the matrix or mold, to a thickness determined by the encompassing guards, as in the usual way of pouring stereotype plates. When the metal or alloy has completely set or hardened, it is lifted or removed from the matrix, its surface is washed with gasoline or other suitable agent, and if to be employed in an ordinary printing press, it is supplied with a support which is of the requisite thickness to bring the printing face of the cast plate, type high.

If the printing plate is to be used on a cylinder press or the like, it is bent to the requisite curvature in the usual way and by any customary means, or the matrix being quite flexible may be curved to desired form, and the plate cast to corresponding curvature. These are matters of choice, and are mentioned merely to show the adaptability of the composition to the production of plates or printing forms capable of use with different types of printing presses or apparatus.

It is particularly to be noted that the composition is mixed in a cold state, no heating of the composition being necessary in any stage of its preparation or use. It is poured onto the backing sheets, plates or blocks, or into the mold, while in liquid form, and sets within an hour or two after being so poured. After being poured upon its backing and allowed to set, it may be brought to the precise thickness desired, and to a smooth, plane surface by passing such sheets or plates between or under plain cold iron rollers, the composition flowing under such pressure, and maintaining the thickness to which it is so brought. Facewise pressure, as between the bed and platen of a screw press, toggle press, or the like, will similarly ensure smoothness and uniform thickness, and this will remain constant under all ordinary conditions and despite atmospheric changes, though care should of course be taken to prevent accumulation of dust or floating particles, and like conditions which might impair the surface.

After setting, the composition is stable, and maintains a fixed consistency and flexibility, unaltered and unaffected by the heat of molten metal brought in contact with it in the production of the printing plate or surface.

The surface of plates, sheets or blocks coated with this composition may be impressed through rolling, or through facewise pressure in a common letter-press or other similar press.

The molded and set composition requires neither dusting nor other preparation, nor any heating to cause it to take care of blank spaces, but flows automatically under pressure to fill the spaces between individual type constituting a form, or to fill larger blank spaces such as are present in engraved blocks and plates, half tones, and the like. Thus upon pressing the pattern firmly against and embedding the raised portions of such pattern or design into the face of the composition, said composition flows into and fills completely all the depressions and all the low spaces of the pattern, form or design, and hence produces a casting or stereotype having a fine texture or surface, requiring neither filling or building up, nor routing.

In actual practice, cast printing plates of various kinds have been produced ready for use, in from three to five minutes, starting with the backed composition, and perfect impressions have been taken by such molded composition from surfaces in which the lines or markings showing the design are so slightly out of common plane that reproduction would generally be deemed impossible.

Owing to the fact that the composition neither expands nor contracts during or after its molding, or its application to the backing surface, the cast plate or form reproduces absolutely the original form or pattern, and such form or pattern will fit with mathematical nicety or precision, its place in a printing press, or in a form of which it constitutes part. This is a feature of marked importance, in that where the plate or printing body is to be used as part of a general form or make-up, great difficulty has heretofore been experienced in causing it to register perfectly, or in positioning it to occupy precisely the space intended.

If the flow of the composition under pressure or rolling to desired thickness causes it to pass beyond the prescribed or intended boundary at any point or points, the excess will be carefully trimmed off or cut away.

What is claimed is:

1. A composition of matter for the production of molds or matrices, comprising the following ingredients in substantially the proportions stated by weight (avoirdupois), to wit: commercial rubber cement, three pounds; carbon tetrachloride, two pounds; benzol, two pounds; talcum powder, four pounds; carbon black, one-half ounce.

2. A composition for the production of matrices, comprising crude rubber, talcum powder and a small percentage of carbon black, together with a suitable solvent for the rubber and carbon tetrachloride to facilitate the smooth and even mixing of the solid ingredients.

3. A composition for the production of matrices, comprising crude rubber, talcum powder and a small percentage of carbon black, together with a suitable solvent for the rubber, and benzol as an aid to setting or solidifying of the composition.

4. As a new article of manufacture, a matrix for receiving impressions and suited for use in casting stereotype plates, comprising a plate or sheet bearing upon one face a closely adhering layer or coating consisting of rubber, finely powdered mineral and carbon black, brought to a tenacious wax-like consistency by mixing with agents which respectively act to facilitate the smooth and even mixing of the solid ingredients and as a solvent for the rubber.

In testimony whereof I have signed my name to this specification.

SHERMAN OSWALD THOMAS.